US012771031B2

(12) United States Patent
Zhu et al.

(10) Patent No.: US 12,771,031 B2
(45) Date of Patent: Oct. 20, 2026

(54) ANTENNA STRUCTURE AND ELECTRONIC DEVICE

(71) Applicant: Wistron NeWeb Corporation, Hsinchu (TW)

(72) Inventors: Jia-Le Zhu, Hsinchu (TW); Chia-Hao Chang, Hsinchu (TW); Ching-Wen Chen, Hsinchu (TW); Cheng-Wei Chiang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 33 days.

(21) Appl. No.: 19/011,712

(22) Filed: Jan. 7, 2025

(65) Prior Publication Data

US 2025/0239771 A1 Jul. 24, 2025

(30) Foreign Application Priority Data

Jan. 24, 2024 (TW) ................................ 113102791

(51) Int. Cl.

*H01Q 9/04* (2006.01)
*H01Q 1/22* (2006.01)
*H01Q 1/48* (2006.01)
*H01Q 5/10* (2015.01)
*H01Q 5/50* (2015.01)

(52) U.S. Cl.

CPC ......... *H01Q 9/0407* (2013.01); *H01Q 1/2266* (2013.01); *H01Q 1/48* (2013.01); *H01Q 5/10* (2015.01); *H01Q 5/50* (2015.01)

(58) Field of Classification Search

CPC ........ H01Q 1/2266; H01Q 1/48; H01Q 1/521; H01Q 5/10; H01Q 5/35; H01Q 5/378; H01Q 5/50; H01Q 9/0407

See application file for complete search history.

(56) References Cited

U.S. PATENT DOCUMENTS

| | | | | |
|---|---|---|---|---|
| 2014/0253394 | A1 | 9/2014 | Nissinen | |
| 2021/0075085 | A1* | 3/2021 | Chang | H01Q 21/28 |

FOREIGN PATENT DOCUMENTS

| | | | | |
|---|---|---|---|---|
| CN | 104901011 A | 9/2015 | | |
| TW | M257522 U | 2/2005 | | |
| TW | 201324942 A * | 6/2013 | | H01Q 1/22 |
| TW | 201711272 A | 3/2017 | | |
| TW | 202103369 A | 1/2021 | | |
| TW | 202111997 A | 3/2021 | | |
| TW | 202224265 A | 6/2022 | | |

* cited by examiner

*Primary Examiner* — Hoang V Nguyen

(74) *Attorney, Agent, or Firm* — McClure, Qualey & Rodack, LLP

(57) ABSTRACT

An antenna structure and an electronic device are proposed. The antenna structure includes a feeding source, a main radiation portion, a grounding portion and a floating portion. The main radiation portion is connected to the feeding source and extends toward a first direction. The grounding portion is connected to a grounding layer, and a first gap is formed between the grounding portion and the main radiation portion. The grounding portion extends toward the first direction. A second gap is formed between the floating portion and the grounding portion. The floating portion extends toward the first direction. The main radiation portion, the grounding portion and the floating portion are arranged sequentially along a second direction.

17 Claims, 6 Drawing Sheets

ANTENNA STRUCTURE AND ELECTRONIC DEVICE

CROSS-REFERENCE TO RELATED PATENT APPLICATION

This application claims the benefit of priority to Taiwan Patent Application No. 113102791, filed on Jan. 24, 2024. The entire content of the above identified application is incorporated herein by reference.

BACKGROUND

Technical Field

The present disclosure relates to an antenna structure and an electronic device, and more particularly, to an antenna structure disposed in a limited space of the electronic device.

Description of Related Art

As the demand for more functionalities and better performance in electronic devices increase, the number of parts installed in portable electronic devices increases, and so the available space for antennas in portable electronic devices decreases.

In view of this, developing an antenna structure and electronic device that can improve space utilization and extend bandwidth has become a goal for relevant industries.

SUMMARY

It is an object of the present disclosure to provide an antenna structure that includes a feeding source, a main radiation portion, a grounding portion, and a floating portion. The main radiation portion is connected to the feeding source and extends toward a first direction. The grounding portion is connected to a grounding layer and extends toward the first direction, and a first gap is formed between the grounding portion and the main radiation portion. The floating portion extends toward the first direction, and a second gap is formed between the floating portion and the grounding portion. The main radiation portion, the grounding portion, and the floating portion are arranged sequentially along a second direction.

It is another object of the present disclosure to provide an electronic device that includes an electronic component and an antenna structure. The electronic component includes a bracket. The antenna structure is disposed on the bracket of the electronic component and includes a feeding source, a main radiation portion, a grounding portion and a floating portion. The main radiation portion is connected to the feeding source and extends toward a first direction. The grounding portion is connected to a grounding layer and extends toward the first direction, and a first gap is formed between the grounding portion and the main radiation portion. The floating portion extends toward the first direction, and a second gap is formed between the floating portion and the grounding portion. The main radiation portion, the grounding portion and the floating portion are arranged sequentially along a second direction.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
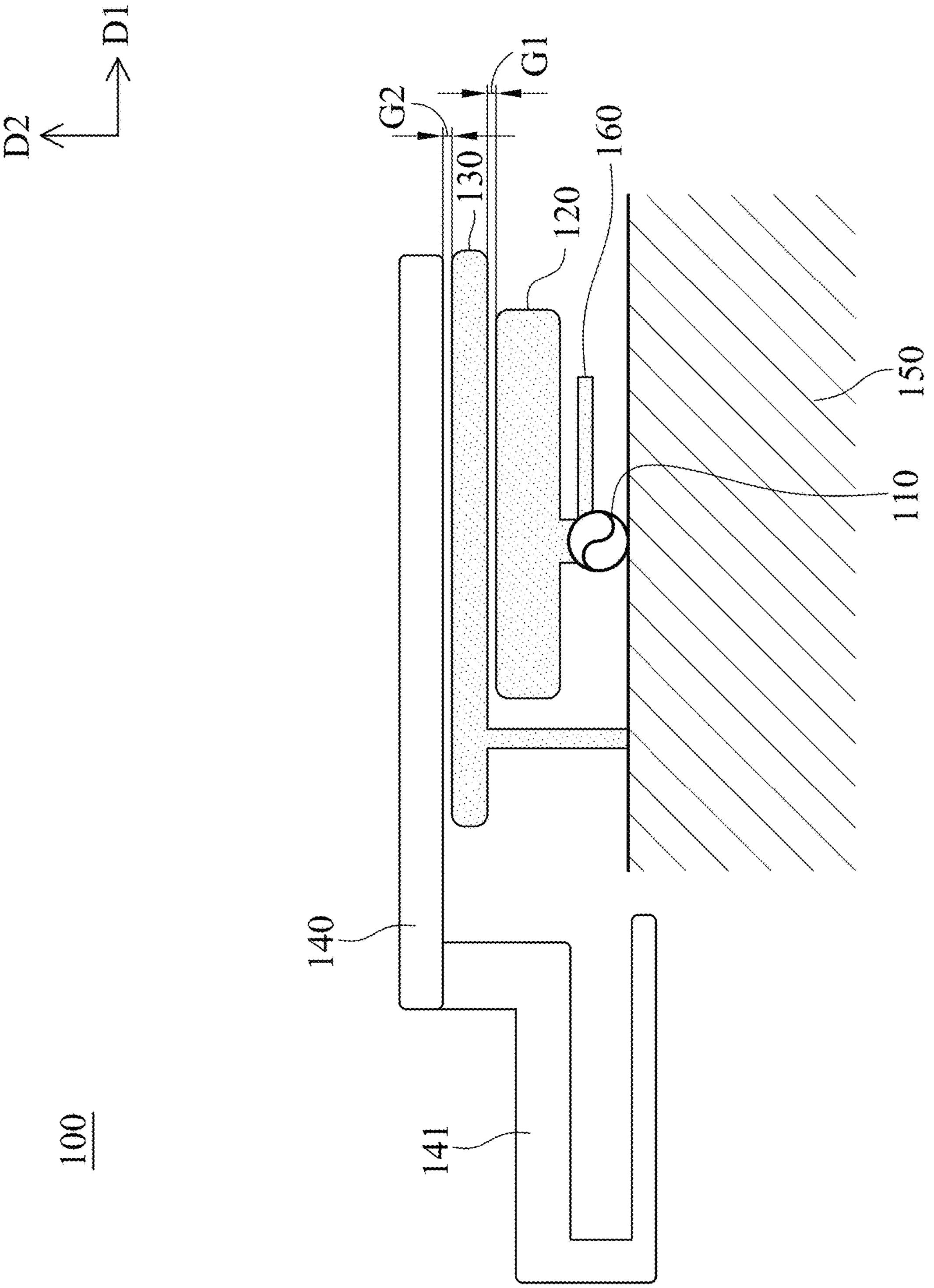
FIG. 1 is a schematic view of an antenna structure according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

FIG. 1 is a schematic view of an antenna structure 100 according to a first embodiment of the present disclosure. Referring to FIG. 1, the antenna structure 100 includes a feeding source 110, a main radiation portion 120, a grounding portion 130 and a floating portion 140. The main radiation portion 120 is connected to the feeding source 110 and extends toward a first direction D1. The grounding portion 130 is connected to a grounding layer 150 and extends towards the first direction D1. There is a first gap G1 formed between the grounding portion 130 and the main radiation portion 120. The grounding portion 140 extends toward the first direction D1, and there is a second gap G2 formed between the floating portion 140 and the grounding portion 130. The main radiation portion 120, the grounding portion 130 and the floating portion 140 are arranged sequentially along a second direction D2, and the first direction D1 is perpendicular to the second direction D2.

More specifically, the main radiation portion 120 and the grounding portion 130 both extend toward the first direction D1 and have a first gap G1 therebetween along the second direction D2, and the main radiation portion 120 and the grounding portion 130 can be in resonance by coupling through the first gap G1. The floating portion 140 also extends toward the first direction D1, and is the second gap G2 apart from the grounding portion 130 along the second direction D2, and the grounding portion 130 and the floating portion 140 generate resonance through coupling via the second gap G2. The floating portion 140 may further include an extension segment 141. The antenna structure 100 may add the extension segment 141 to the floating portion 140 according to the environmental space, and the length and shape of the extension segment 141 can be adjusted according to the required bandwidth, so as to extend the low-frequency bandwidth of the antenna structure 100, but the present disclosure is not limited thereto.

In addition, the antenna structure 100 may further include a branch radiation portion 160. The branch radiation portion 160 is connected to the main radiation portion 120 and extends toward the first direction D1. The branch radiation portion 160, the main radiation portion 120, the grounding portion 130 and the floating portion 140 are arranged in order along the second direction D2.

The main radiation portion 120 has a first resonance frequency, the grounding portion 130 has a second resonance frequency, the floating portion 140 has a third resonance frequency, and the branch radiation portion 160 has a fourth resonance frequency. The first, second, third, and fourth resonance frequencies do not overlap. Further, the first resonance frequency is generated by the main radiation portion 120, which is between 2.3 GHz and 2.69 GHz, and the second resonance frequency is generated by the resonance of the main radiation portion 120 and the grounding portion 130, which is between 1.7 GHz and 2.3 GHz. The third resonance frequency is generated by the resonance of the main radiation portion 120, the grounding portion 130 and the floating portion 140, which is between 1.4 GHz and 1.7 GHz, and the fourth resonance frequency is 3 GHz. Hence, the antenna structure 100 of the present disclosure can broaden the low-frequency band of the antenna structure 100 in a limited space. The structure of the antenna structure 100 will be illustrated below by a more detailed embodiment.

Figure 2:
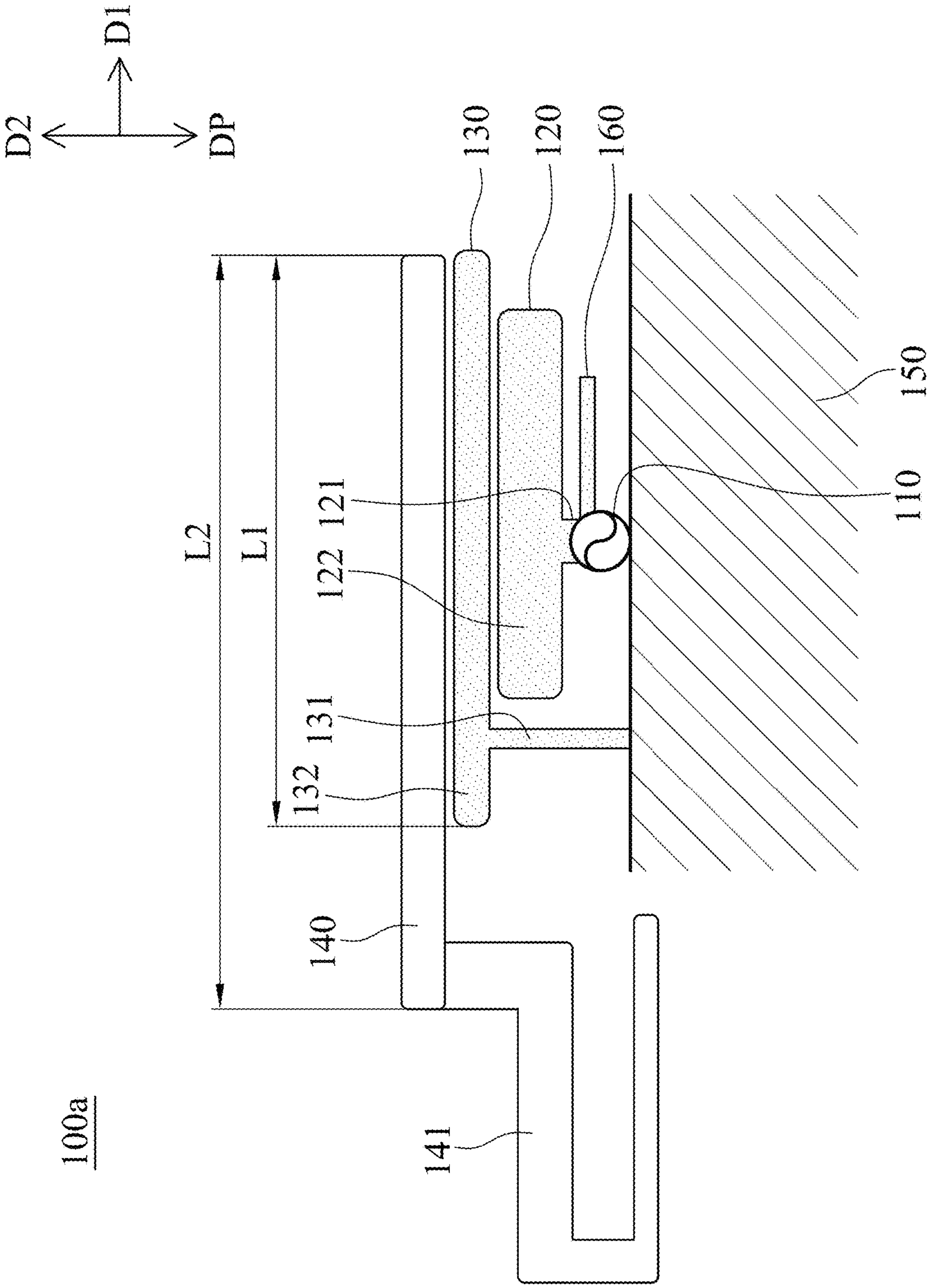
FIG. 2 is a schematic view of an antenna structure according to a second embodiment of the present disclosure.

FIG. 2 is a schematic view of an antenna structure 100*a* according to a second embodiment of the present disclosure. Referring to FIG. 1 and FIG. 2, the antenna structure 100*a* includes a feeding source 110, a main radiation portion 120, a grounding portion 130, a floating portion 140 and a branch radiation portion 160. In the second embodiment, the feeding source 110, the floating portion 140 and the branch radiation portion 160 of the antenna structure 100*a* are structurally similar to the feeding source 110, the floating portion 140 and the branch radiation portion 160 of the first embodiment, and are not described herein. In particular, the main radiation portion 120 has a first segment 121 and a second segment 122. The first segment 121 is connected to the feeding source 110. The second segment 122 is connected to and perpendicular to the first segment 121 and extends toward the first direction D1. The grounding portion 130 has a third segment 131 and a fourth segment 132. The third segment 131 is connected to the grounding layer 150. The fourth segment 132 is connected to and perpendicular to the third segment 131 and is parallel to the second segment 122.

Specifically, the main radiation portion 120 and the grounding portion 130 can be T-shaped or L-shaped, but the present disclosure is not limited thereto. The main radiation portion 120, the grounding portion 130 and the floating portion 140 are partially overlapped in a vertical projection direction DP. In other words, the second segment 122 of the main radiation portion 120, the fourth segment 132 of the grounding portion 130 and the floating portion 140 partially overlap along the vertical projection direction DP. In addition, the grounding portion 130 and the floating portion 140 partially overlap by a section in the vertical projection direction DP, and the section has an overlap length greater than or equal to one-fifth of a length of the floating portion 140. Specifically, a section of the fourth segment 132 and a section of the floating portion 140 that overlap in the vertical projection direction DP has an overlap length L1, and the overlap length L1 is greater than or equal to one-fifth of the length L2 of the floating portion 140, but the present disclosure is not limited thereto, the overlap length L1 can be adjusted according to the required frequency and space limitation. The second segment 122 of the main radiation portion 120 couples with the branch radiation portion 160.

Figure 3:
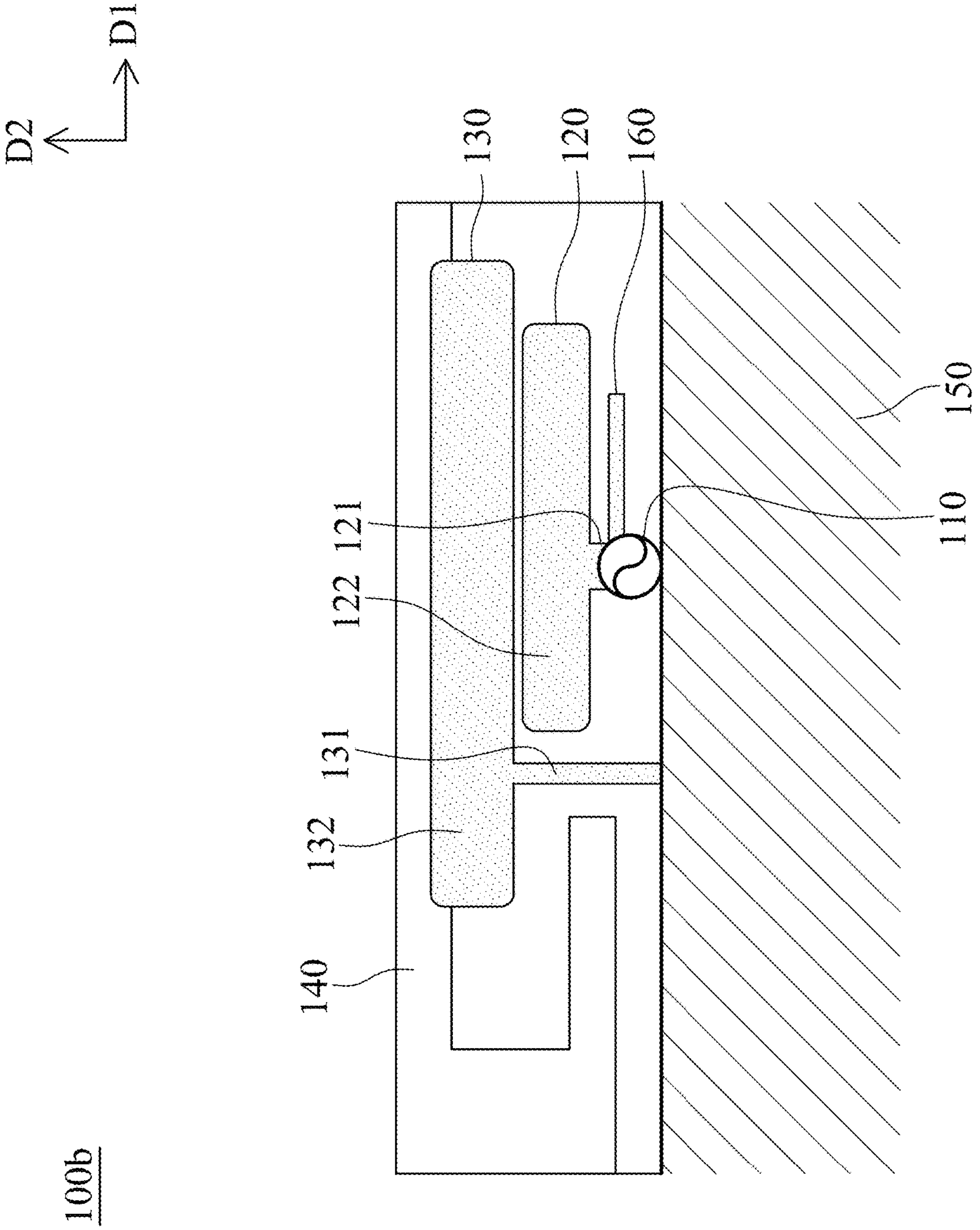
FIG. 3 is a schematic view of an antenna structure according to a third embodiment of the present disclosure.

FIG. 3 is a schematic view of an antenna structure 100*b* according to a third embodiment of the present disclosure. Referring to FIG. 1 and FIG. 3, the antenna structure 100*b* includes a feeding source 110, a main radiation portion 120, a grounding portion 130, a floating portion 140 and a branch radiation portion 160. In the third embodiment, the feeding source 110, the main radiation portion 120, the grounding portion 130 and the branch radiation portion 160 of the antenna structure 100*b* are structurally similar to the feeding source 110, the main radiation portion 120, the grounding portion 130 and the branch radiation portion 160 of the second embodiment, and are not described herein. In particular, the antenna structure 100*b* is a planar antenna, the grounding portion 130 and the floating portion 140 overlap along a third direction (not marked), and the third direction is perpendicular to the first direction D1 and the second direction D2. In FIG. 3, the third direction may be the direction coming out of the drawing surface or going into the drawing surface, but the present disclosure is not limited thereto.

Figure 4:
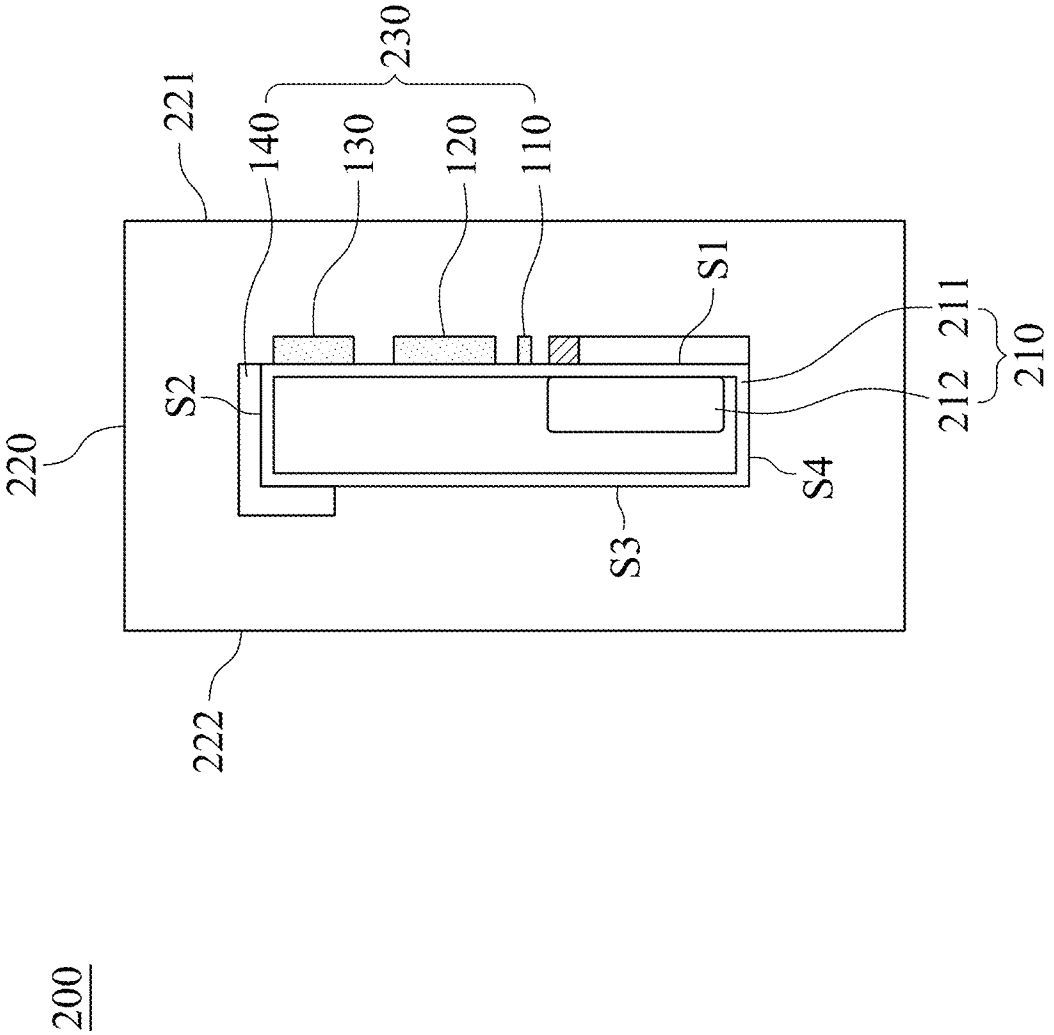
FIG. 4 is a schematic view of an electronic device according to a fourth embodiment of the present disclosure.
Figure 7:
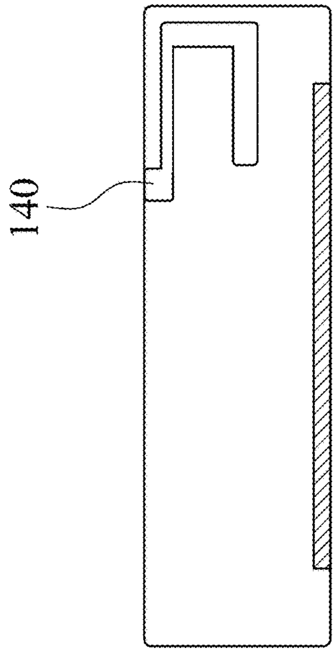
FIG. 7 is a schematic view of a third side of the bracket of the electronic device shown in FIG. 4.
Figure 6:
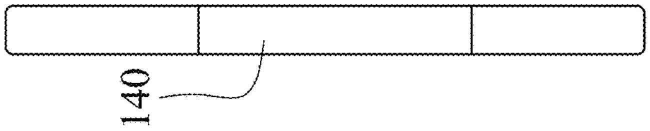
FIG. 6 is a schematic view of a second side of the bracket of the electronic device shown in FIG. 4.
Figure 5:
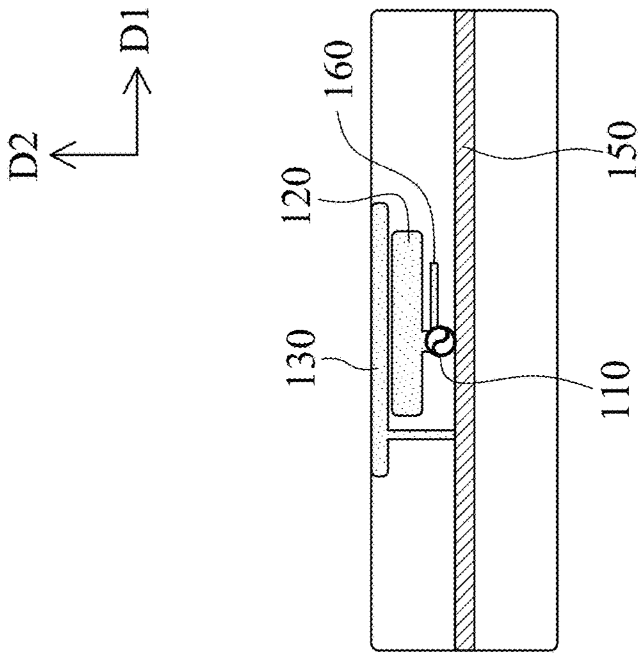
FIG. 5 is a schematic view of a first side of a bracket of the electronic device shown in FIG. 4.

FIG. 4 is a schematic view of an electronic device 200 according to a fourth embodiment of the present disclosure; FIG. 5 is a schematic view of a first side S1 of a bracket 211 of the electronic device 200 shown in FIG. 4; FIG. 6 is a schematic view of a second side S2 of the bracket 211 of the electronic device 200 shown in FIG. 4; FIG. 7 is a schematic view of a third side S3 of the bracket 211 of the electronic device 200 shown in FIG. 4. Referring to FIG. 4 to FIG. 7, the electronic device 200 includes an electronic component 210, a housing 220 and an antenna structure 230. The electronic component 210 includes a bracket 211. The housing 220 includes a first cover 221 and a second cover 222. The second cover 222 is opposite the first cover 221. The antenna structure 230 is disposed on the bracket 211 of the electronic component 210 and includes a feeding source 110, a main radiation portion 120, a grounding portion 130, a floating portion 140 and a branch radiation portion 160. In the fourth embodiment, the feeding source 110, the main radiation portion 120, the grounding portion 130, the floating portion 140 and the branch radiation portion 160 of the antenna structure 230 are structurally similar to the feeding source 110, the main radiation portion 120, the grounding portion 130, the floating portion 140 and the branch radiation portion 160 of the antenna structure 100 of the first embodiment, and are not described herein. Specifically, the bracket 211 has a first side S1, a second side S2, a third side S3 and a fourth side S4. The feeding source 110 is arranged on the first side S1 of the bracket 211, the main radiation portion 120 is arranged on the first side S1 of the bracket 211, the grounding portion 130 is arranged on the first side S1 of the bracket 211, and the floating portion 140 is arranged on the second side S2 of the bracket 211 and extends to the third side S3 of the bracket 211. The second side S2 is connected between the first side S1 and the third side S3. The grounding layer 150 is arranged on the first side S1. The branch radiation portion 160 is arranged on the first side S1. The first side S1 of the bracket 211 is facing the first cover 221, and the third side S3 of the bracket 211 is facing the second cover 222. In detail, the first cover 221 and the second cover 222 can be the C part and the D part of a notebook computer respectively, but the present disclosure is not limited thereto.

The electronic component 210 further includes a metal element 212. The metal element 212 is arranged between the first side S1 and the third side S3 of the bracket 211, and the electronic component 210 may be one of a speaker assembly, a metal frame, a magnet and an input/output port. The metal element 212 may be a metal material part in the electronic component 210, but the present disclosure is not limited thereto. In the fourth embodiment, the electronic component 210 is a speaker assembly, and it can be seen from the FIG. 4 to FIG. 7 that the antenna structure 230 is arranged around the bracket 211 of the electronic component 210 and generate resonance by coupling with the metal element 212 of the electronic component 210. Hence, the electronic device 200 of the present disclosure can arrange the antenna structure 230 in the space around the metal element 212 of the electronic component 210, so as to improve the space utilization rate of the electronic device 200.

Figure 8:
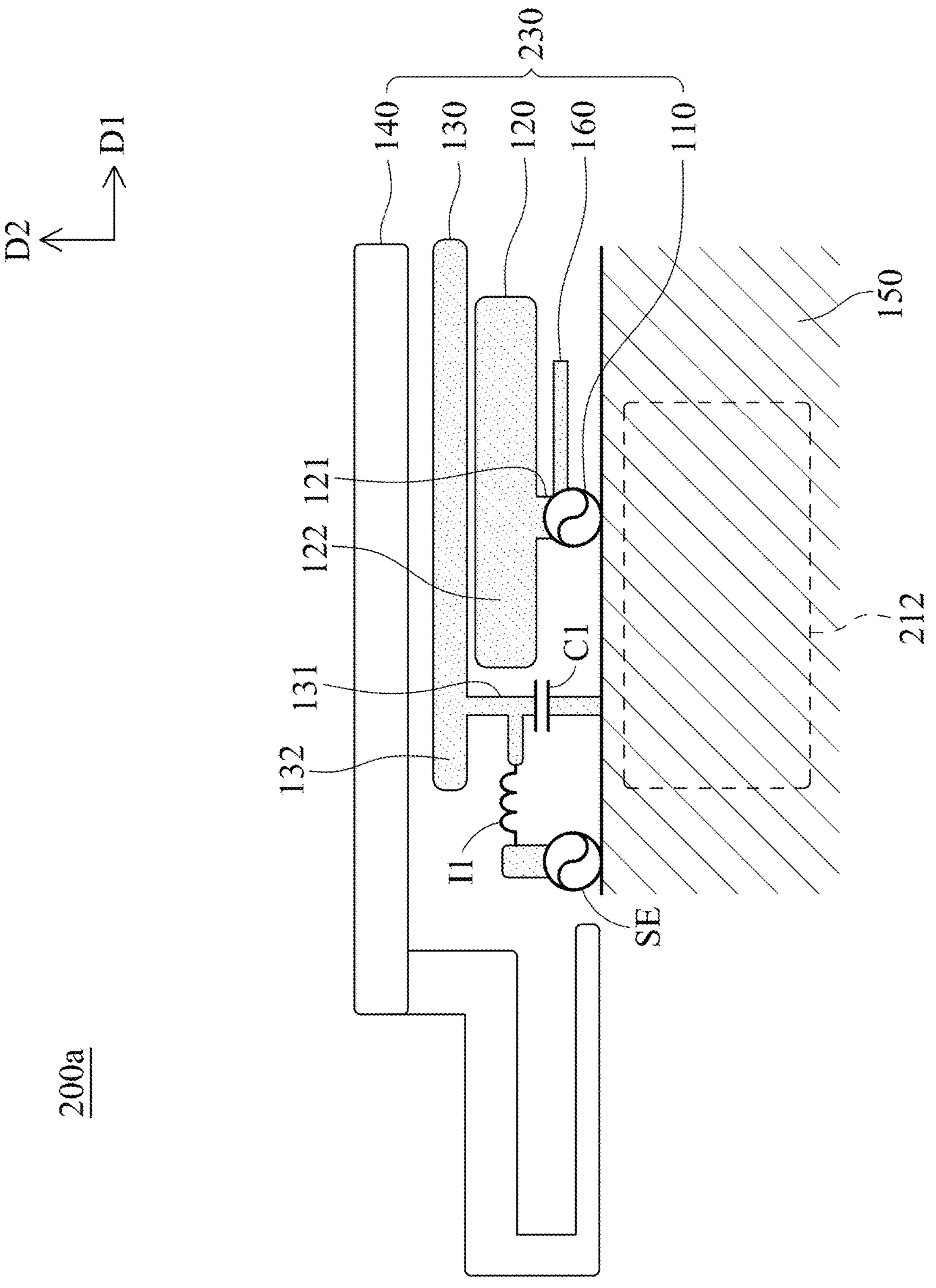
FIG. 8 is a schematic view of an electronic device according to a fifth embodiment of the present disclosure.

FIG. 8 is a schematic view of an electronic device **200*a* according to a fifth embodiment of the present disclosure. Referring to FIG. 4 and FIG. 8, the electronic device 200*a* includes an electronic component 210 and an antenna structure 230. The antenna structure 230 is arranged in the bracket 211 of the electronic component 210 and includes a feeding source 110, a main radiation portion 120, a grounding portion 130, a floating portion 140 and a branch radiation portion 160. In the fifth embodiment, the feeding source 110, the main radiation portion 120, the grounding portion 130, the floating portion 140 and the branch radiation portion 160 of the antenna structure 230 are structurally similar to the feeding source 110, the main radiation portion 120, the grounding portion 130, the floating portion 140 and the branch radiation portion 160 of the antenna structure 100 of the first embodiment, and are not described herein. In particular, the electronic device 200*a* further includes a sensing unit SE, an inductive component 11 and a capacitive component C1. The inductive component 11 is connected between the grounding portion 130 and the sensing unit SE. The capacitive component C1 is connected to the grounding portion 130 and is used to isolate the signals of the sensing units SE. Thus, the antenna structure 230 in the electronic device 200*a* of the present disclosure can be connected to the inductive component 11 and the capacitive component C1, so as to prevent signal interference from the sensing unit SE in the electronic device 200*a***.

In view of the above, the antenna structure and the electronic device of the present disclosure have the following advantages. First, the low-frequency band of the antenna structure can be broadened in a limited space. Second, the antenna structure can be arranged in the space around the metal part of the electronic component to improve the space utilization rate of the electronic device. Third, the inductive component and the capacitive component can be used in the antenna structure, so that the antenna structure does not interfere with the signals relating to the sensing unit in the electronic device.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna structure comprising:

a feeding source;

a main radiation portion connected to the feeding source and extending toward a first direction;

a grounding portion connected to a grounding layer and extending toward the first direction, wherein a first gap is formed between the grounding portion and the main radiation portion; and a floating portion extending toward the first direction, wherein a second gap is formed between the floating portion and the grounding portion;

wherein the main radiation portion, the grounding portion and the floating portion are arranged sequentially along a second direction;

wherein the grounding portion and the floating portion overlap along a third direction, the third direction is perpendicular to the first direction and the second direction, and the first direction is perpendicular to the second direction.

2. The antenna structure according to claim 1, wherein the main radiation portion comprises a first resonance frequency, the grounding portion comprises a second resonance frequency, the floating portion comprises a third resonance frequency, and the first resonance frequency, the second resonance frequency and the third resonance frequency do not overlap.

3. The antenna structure according to claim 1, further comprising:

a branch radiation portion connected to the main radiation portion and extending toward the first direction;

wherein the branch radiation portion, the main radiation portion, the grounding portion and the floating portion are arranged sequentially along the second direction.

4. The antenna structure according to claim 3, wherein the main radiation portion comprises a first resonance frequency, the grounding portion comprises a second resonance frequency, the floating portion comprises a third resonance frequency, and the branch radiation portion comprises a fourth resonance frequency, and the first resonance frequency, the second resonance frequency, the third resonance frequency and the fourth resonance frequency do not overlap.

5. The antenna structure according to claim 1, wherein, the main radiation portion comprises:

a first segment connected to the feeding source; and a second segment connected to the first segment, perpendicular to the first segment, and extending toward the first direction; and the grounding portion comprises:

a third segment connected to the grounding layer; and a fourth segment connected to the third segment, perpendicular to the third segment, and parallel to the second segment.

6. The antenna structure according to claim 1, wherein the main radiation portion, the grounding portion and the floating portion are partially overlapped in a vertical projection direction.

7. The antenna structure according to claim 6, wherein the grounding portion and the floating portion partially overlap by a section in the vertical projection direction, the section comprises an overlap length greater than or equal to one-fifth of a length of the floating portion.

8. An electronic device comprising:

an electronic component, comprising:

a bracket; and an antenna structure disposed on the bracket of the electronic component and comprising:

a feeding source;

a main radiation portion connected to the feeding source and extending toward a first direction;

a grounding portion connected to a grounding layer, and extending toward the first direction, wherein a first gap is formed between the main radiation portion and the grounding portion; and a floating portion extending toward the first direction, wherein a second gap is formed between the floating portion and the grounding portion;

wherein the main radiation portion, the grounding portion and the floating portion are arranged sequentially along a second direction;

wherein the feeding source is disposed on a first side of the bracket, the main radiation portion is disposed on the first side of the bracket, the grounding portion is disposed on the first side of the bracket, and the floating portion is disposed on a second side of the bracket and extends to a third side of the bracket, wherein the second side is connected between the first side and the third side.

9. The electronic device according to claim 8, wherein the electronic component further comprises:

a metal element disposed between the first side and the third side of the bracket;

wherein the electronic component is one of a speaker assembly, a metal frame, a magnet and an input/output port.

10. The electronic device according to claim 8, further comprising:

a sensing unit;

an inductive component connected between the grounding portion and the sensing unit; and a capacitive component connected to the grounding portion and configured to isolate a signal of the sensing unit.

11. The electronic device according to claim 8, wherein the main radiation portion comprises a first resonance frequency, the grounding portion comprises a second resonance frequency, the floating portion comprises a third resonance frequency, the first resonance frequency is higher than the second resonance frequency, and the second resonance frequency is higher than the third resonance frequency.

12. The electronic device according to claim 8, further comprising:

a branch radiation portion connected to the main radiation portion, extending toward the first direction, and disposed on the first side;

wherein the branch radiation portion, the main radiation portion, the grounding portion and the floating portion are arranged sequentially along the second direction.

13. The electronic device according to claim 12, wherein the main radiation portion comprises a first resonance frequency, the grounding portion comprises a second resonance frequency, the floating portion comprises a third resonance frequency, the branch radiation portion comprises a fourth resonance frequency, the first resonance frequency is higher than the second resonance frequency, the second resonance frequency is higher than the third resonance frequency, and the third resonance frequency is higher than the fourth resonance frequency.

14. The electronic device according to claim 8, wherein, the main radiation portion comprises:

a first segment connected to the feeding source; and a second segment connected to the first segment, perpendicular to the first segment and extending toward the first direction; and the grounding portion comprises:

a third segment connected to the grounding layer; and a fourth segment connected to the third segment, perpendicular to the third segment, and parallel to the second segment.

15. The electronic device according to claim 8, wherein the floating portion and the grounding portion partially overlap in a vertical projection direction.

16. The electronic device according to claim 15, wherein the grounding portion and the floating portion partially overlap by a section in the vertical projection direction, the section comprises an overlap length greater than or equal to one-fifth of a length of the floating portion.

17. The electronic device according to claim 8, further comprising:

a housing comprising:

a first cover; and a second cover, opposite to the first cover;

wherein the first side of the bracket faces the first cover, and the third side of the bracket faces the second cover.

* * * * *